United States Patent [19]
Edberg

[11] Patent Number: 5,701,113
[45] Date of Patent: Dec. 23, 1997

[54] PASSIVE NON-CONTACTING CENTERING SYSTEM

[75] Inventor: Donald L. Edberg, Irvine, Calif.

[73] Assignee: McDonnell Douglas Corporation, Huntington Beach, Calif.

[21] Appl. No.: 608,540

[22] Filed: Feb. 28, 1996

[51] Int. Cl.⁶ ........................................ H01F 7/20
[52] U.S. Cl. .................. 335/285; 310/90.5; 446/133
[58] Field of Search ........................... 335/285, 286, 335/287, 301, 306; 310/90.5; 440/133

[56] References Cited

U.S. PATENT DOCUMENTS

| | | |
|---|---|---|
| 3,860,300 | 1/1975 | Lyman . |
| 4,033,541 | 7/1977 | Malueg . |
| 4,083,433 | 4/1978 | Goehegan Jr. et al. . |
| 4,443,743 | 4/1984 | Forys et al. . |
| 4,848,525 | 7/1989 | Jacot et al. . |
| 4,874,998 | 10/1989 | Hollis Jr. . |
| 5,005,678 | 4/1991 | Julien et al. . |
| 5,059,789 | 10/1991 | Salcudean . |
| 5,146,566 | 9/1992 | Hollis Jr. et al. . |
| 5,206,504 | 4/1993 | Sridharan . |
| 5,231,336 | 7/1993 | Van Namen . |
| 5,250,865 | 10/1993 | Meeks ................................ 310/90.5 |
| 5,506,459 | 4/1996 | Ritts ................................... 310/90.5 |

OTHER PUBLICATIONS

Cunningham et al, "Design of the Annular Suspension and Positioning System (ASPS) (Including Design Addendum)" NASA Contractor Report 3343, contract NAS1-14214 (Oct. 1980).

*Primary Examiner*—Lincoln Donovan
*Attorney, Agent, or Firm*—Bell, Seltzer, Park & Gibson, P.A.

[57] ABSTRACT

Permanent magnets affixed to one structure produce a repelling force to magnets affixed to a larger structure that encloses the one structure to suspend and hold the one structure entirely within the larger structure, without physical contact therebetween.

14 Claims, 1 Drawing Sheet

PASSIVE NON-CONTACTING CENTERING SYSTEM

This application is related to application Ser. No. 08/496,192, filed Jun. 28, 1995, entitled NON-CONTACTING ISOLATED STABILIZED MICROGRAVITY PLATFORM SYSTEM, copending herewith, for which the benefit of 35 U.S.C. 120 is claimed.

FIELD OF THE INVENTION

This invention relates to centering devices and, more particularly, to apparatus for suspending one structure in a physically isolated position inside another larger structure within an orbiting space vehicle, without requiring physical contact between the two structures.

BACKGROUND

Suspending one object within another without any physical connection between the two objects has in the past been the subject of novelty amusement devices, referred to as levitation. One such levitation device previously observed is the "Revolution" brand spinning device, marketed by the Carlisle Company of Carson City, Nev. That device purportedly employs a magnetically suspended rotating device, although the details thereof are not known to the applicant. While novelty devices of that type provide considerable amusement, appearing to defy the physical laws of gravity, more serious application is found on board orbiting space vehicles, wherein the effect of earth's gravity appears non-existant and unrestrained objects essentially float freely in space.

The weightnessless of outer space permits one object to be positioned relative to another without physical contact between the two. That principle was earlier adapted by the applicant to provide a physically isolated platform that is positioned in a volume defined by a structure, the frame. Despite relative drift in position as may occur between the two members, the relative position of such members is maintained in a predetermined relative position, the base position, using position sensors to sense the drift in position and wide gap magnetic actuators to restore the members to the base position.

Such magnetic actuators contain two principal parts, a relatively flat shaped armature, that is located on one member, the frame, and an associated U-shaped magnetic frame containing attached permanent magnets, defining a magnet assembly, that is located on the platform, and such armature and magnet assembly are movable relative to one another. The armatures contains electrical coils that are under computer control and produce magnetic fields responsive to current through the electrical coil. The separate magnet assembly is attached to the platform and the magnets, located at the ends of the U-shaped magnetic frame and facing one another, create a magnetic field across the gap between the ends of the stems of the U configuration or pole tips, as variously termed.

Associated position sensors detect any drift in relative position between the frame and the platform, such as might be caused by atomospheric drag or by any acceleration forces applied to the platform and supplies that information to an associated computer. In turn, the computer outputs appropriate electrical current to the armature coils.

Through the electromotive force produced by interaction with the magnetic field produced in the magnetic gap, the magnet assembly moves in response to correctly reposition the associated platform to which the magnet assembly is mechanically coupled. Such a platform is particularly useful in the conduct of microgravity experiments and manufactures, which can be accomplished only in orbital flight. Such is the subject of a copending application Ser. No. 08/496,192, filed Jun. 28, 1995.

While centering of the platform within the frame in that way is effective, it is preferable if a less complex positioning system were available as an alternative so that the wide gap magnetic actuators may be eliminated from the drift compensation arrangement, such as that compensating for atmospheric drag, allowing those actuators to be used exclusively for other functions within the microgravity platform system.

An object of the present invention is to provide a centering system for a microgravity platform system.

And another object of the invention is to provide a simple and reliable system for automatically centering one structure within another structure and maintaining the two objects in that relationship without requiring any physical contact between the two objects.

SUMMARY OF THE INVENTION

In accordance with the foregoing objects, the present invention employs a system of permanent magnets to maintain a first structure in a levitated position within a second structure. Some of the permanent magnets are carried by the first structure and some by the second structure at distributed locations on such structures, wherein the magnet flux holds the first structure in a balance position within the second structure. A specific embodiment of the invention includes a first rectangular shaped structure that fits within and is centered within a larger second rectangular shaped structure, without physical contact between the two structures by sets of Permanent magnets are located at each corner of each of the two structures. The magnets on one structure produce a repelling force to the magnets on the other structure and thereby suspends and holds the second structure entirely within the first structure without physical contact therebetween.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DESCRIPTION OF THE PREFERRED EMBODIMENT

Figure 1:
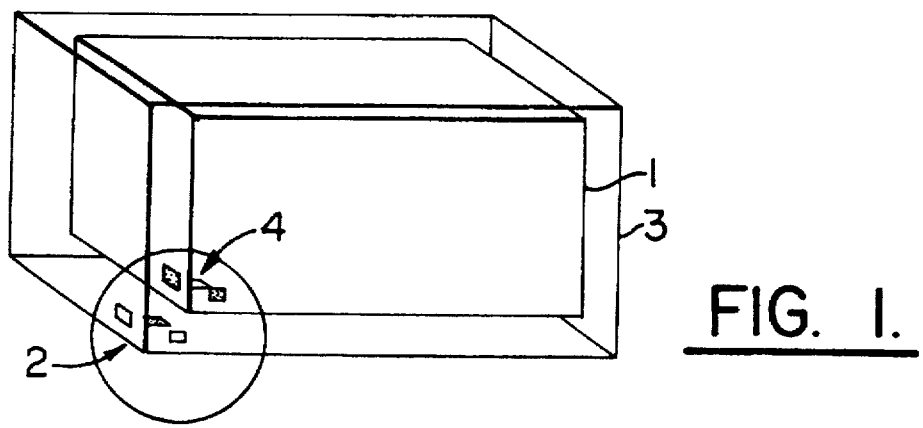
FIG. 1 illustrates an embodiment of the invention.

Reference is made to FIG. 1, in which a rectangular structure or box 1, referred to as the platform, is positioned within another smaller rectangular structure or box 3, as variously termed, sometimes referred to as the frame. Frame 3 is of a greater volume than platform 1 and, as illustrated, the platform is spaced in position from and does not contact the internal walls of frame 3. The walls of frame 3 are shown as being transparent to better illustrate the relationship of the components. In other embodiments the frame may comprise simply structural ribs without walls, and ribs for supporting the magnets. Each of frame 3 and platform 1 are formed of non-magnetic material, such as aluminum, and are relatively rigid.

A set of three permanent magnets is located at each of the eight corners of frame 3. For clarity, only one set of such magnets is illustrated, such as the three permanent magnets illustrated at 2 at the lower left front corner of frame 3. A corresponding set of three permanent magnets is also located at each of the eight corners of platform 1, only one set of which is illustrated, such as the three permanent magnets illustrated at 4 in the lower left front corner of platform 1. It should be recognized however, while eight such sets are thus called for in this embodiment, as few as six sets of such magnets may be used to the same effect by strategically locating some of the six sets at locations other than the corners of the rectangular structures.

Figure 2:
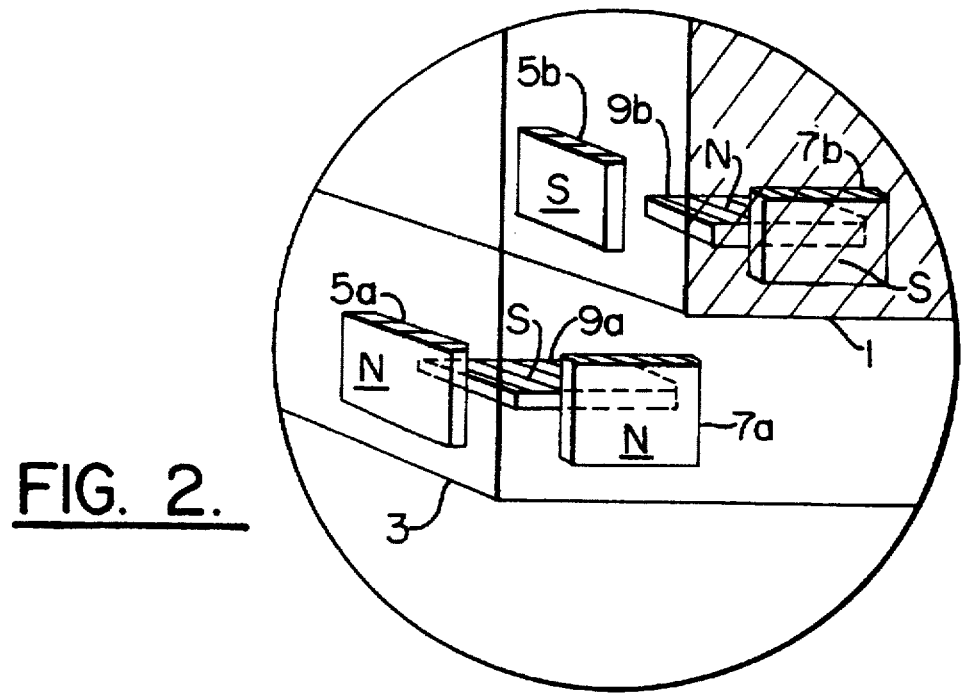
FIG. 2 is an enlarged partial section view of the embodiment of FIG. 1.

As illustrated in greater scale in the enlarged partial section view of FIG. 2, the set of magnets 2 at the lower front left corner of frame 3 comprises the three rectangular shaped magnets 5a, 7a and 9a. The magnets are affixed as illustrated at the lower left edge or corner of frame 3. The corresponding set of magnets 4 at that same corner of platform 1 comprises the three rectangular shaped magnets 5b, 7b, and 9b. The latter magnets are affixed to the corresponding lower left corner of frame 1.

Magnet 5a is affixed to the left side vertical wall adjacent the vertice; magnet 7a is affixed to the front vertical wall adjacent the same vertice and magnet 9a is affixed to the bottom wall adjacent that vertice. The corresponding magnets 5b, 7b and 9b are attached to the corresponding left side, front and bottom walls of platform 1. The walls and, hence the magnet, are oriented along three mutually orthogonal planes.

Each magnet in the set on one structural member is oriented with its south magnetic pole facing the south magnetic pole of the corresponding magnet of the other structural member. Thus, as example, the south pole of magnet 5a faces the south pole of magnet 5b; the south pole of magnet 7a faces the south pole of magnet 7b; and the south pole of magnet 9a faces the south pole of magnet 9b. The foregoing is presented as example, as one recognizes that the poles of the magnets may be reversed by choice. Essentially, the magnetic field or flux, as variously termed, produced by a magnet in one set is opposed in direction to the magnetic field produced by a magnet in the corresponding set of magnets, creating a repelling force between the two and therefore between the structural members with which they are respectively attached.

The corresponding sets of magnets at each of the remaining corners of frame 3 and platform 1 are of like structure, orientation and function. Each corner of the frame essentially repels the corresponding corner of the platform. Since platform 1 is inside frame 3 and all corners of the platform are being equally repelled, platform 1 remains in levitation, centered within frame 3, and there is no physical contact between the frame and the platform. Should a mechanical perturbation occur which causes relative movement of one structural member relative to the other, the force of the magnetic fields restores the relationship.

The permanent magnets are conventional and may be of the Samarium Cobalt type, the Neodynium Iron Boron type or of Alnico or any other readily available magnetic material. The magnetic fields produced by the magnets need not be strong, since, in outer space, the platform is essentially weightless and there is no weight force that the magnets need to counteract. That also holds true where additional equipment is carried by platform 1, such as when the platform is used as an element of a microgravity platform system described in the prior application Ser. No. 08/496, 192, filed Jun. 28, 1995. In such situation, the magnetic force produced by each of the magnets is the same, and that produced by each set of magnets at a vertice is the same.

The magnets in the foregoing embodiment are all of the same physical size and produce the same intensity of magnetic flux. If, however, the centering system is employed in a higher gravitational field, such as on earth, then the bottom magnets must produce sufficient additional repelling force to off set the force of weight of the platform as well as any other mass seated on the platform. In that instance, the bottom magnets must be capable of generating more powerful magnetic fields. This is accomplished by judicious energization of the magnet and/or by changing the physical size and/or composition of one or more magnets and may be determined experimentally. Other instances where different size or intensity magnets may be used for one or more of the sets of magnets or one or more of the magnets within a set may be needed to account for pre-loads or biases. Again such selection may be determined experimentally.

The preceeding embodiment is of rectangular structure. It is apparent that the invention may be employed with structures having other geometric shapes, other than rectangular, such as pyramids, to accomplish centering of one structure within the other. It is appreciated that the number of complementary sets of magnets required for such additional embodiments may differ from the eight complementary sets of three magnets used in the illustrated rectangular shaped embodiment. While the minimum number is not presently known for other than the rectangular structure illustrated, it is anticipated that a minimum of three complementary sets would be required for centering of the structure, with each half of such set formed of three permanent magnets.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A passive, non-contacting centering system comprising:

a first structure, said first structure having eight corners and defining a first volume of rectangular shape;

a second structure, said second structure having eight corners and defining a second volume of rectangular shape;

said second structure being smaller in size than said first structure and said first structure receiving said second structure within said first volume such that the corners of said first structure are in general alignment with the corners of said second structure; and means for maintaining said second structure within said first volume and in spaced relation to said first structure, said means for maintaining comprising:

first magnet means located adjacent each of said corners of said first structure for producing first magnetic fields; and second magnet means located adjacent each of said corners of said second structure for producing second magnetic fields;

wherein said first and second magnetic fields produce a repelling force at each of said corners, said repelling force at each of said corners being sufficient in intensity to suspend said second structure entirely within said first volume in spaced relationship with said first structure such that said second structure does not contact said first structure.

2. The invention as defined in claim 1, wherein each of said first and second structures comprise non-magnetic material.

3. The invention as defined in claim 1, wherein said first magnet means at each said corner of said first structure includes:

first, second and third magnets;

said first, second and third magnets being positioned to produce magnetic fields in each of three mutually orthogonal directions.

4. The invention as defined in claim 1, wherein said first magnet means at each said corner of said first structure includes:

first, second and third magnets;

said first, second and third magnets being positioned to produce magnetic fields in each of three mutually orthogonal directions; and wherein said second magnet means at each corner of said second structure includes:

first, second and third magnets;

said first, second and third magnets of said second magnet means being positioned to produce magnetic fields in each of three mutually orthogonal directions; and wherein said magnetic fields produced in each orthogonal direction by said first magnet means at a respective one of said corners of said first structure are opposed in direction to said magnetic fields produced in each of said respective orthogonal directions by said corresponding second magnet means located at the corresponding corner of said second structure.

5. The invention as defined in claim 1, wherein each of said first, second and third magnets of each of said first and second magnet means comprise rectangular magnets.

6. The invention as defined in claim 5, wherein each of said rectangular magnets are identical in size.

7. The invention as defined in claim 5, wherein at least some of said rectangular magnets are identical in size and some other of said rectangular magnets are not identical in size.

8. A passive, non-contacting centering system comprising:

a frame defining an internal cavity;

a platform disposed at least partially within the internal cavity defined by said frame;

a plurality of sets of frame magnets disposed at spaced apart locations upon said frame, each set of frame magnets comprising magnets oriented to produce magnetic fields in each of three mutually orthogonal planes; and a plurality of sets of platform magnets disposed at spaced apart locations upon said platform which correspond to respective locations upon said frame at which said sets of frame magnets are disposed, each set of platform magnets also comprising magnets oriented to produce magnetic fields in each of three mutually orthogonal planes;

wherein the frame magnets and the platform magnets of each corresponding set are oriented such that the respective magnetic fields produced by the frame magnets and the platform magnets in each of the three mutually orthogonal planes repel said platform from said frame such that said platform is centered within the internal cavity defined by said frame without physically contacting said frame.

9. A passive, non-contacting centering system according to claim 8 wherein each set of frame magnets and each set of platform magnets comprises three magnets which produce magnetic fields in respective ones of the three mutually orthogonal planes, wherein each magnet has opposing north and south poles, and wherein the frame magnets and the platform magnets of each corresponding set are oriented such that the respective south poles of the frame magnets and the platform magnets are aligned and the respective north poles of the frame magnets and the platform magnets are aligned to thereby repel said platform from said frame.

10. A passive, non-contacting centering system according to claim 8 wherein said plurality of sets of frame magnets comprises at least three sets of frame magnets, and wherein said plurality of sets of platform magnets comprises at least three sets of platform magnets.

11. A passive, non-contacting centering system according to claim 8 wherein both said frame and said platform define a plurality of corners, wherein said plurality of sets of frame magnets are disposed at respective corners of said frame, and wherein said plurality of sets of platform magnets are disposed at respective corners of said platform.

12. A passive, non-contacting centering system according to claim 11 wherein both said frame and said platform are rectangular structures having eight corners, wherein said plurality of sets of frame magnets comprises eight sets of frame magnets disposed at respective ones of the eight corners of said frame, and wherein said plurality of sets of platform magnets comprises eight sets of platform magnets disposed at respective ones of the eight corners of said platform.

13. A passive, non-contacting centering system according to claim 8 wherein both said frame and said platform are comprised of non-magnetic materials.

14. A passive, non-contacting centering system according to claim 8 wherein said frame comprises a plurality of structural ribs defining the internal cavity.

* * * * *